United States Patent
De Schamphelaere (10) Patent No.: US 11,549,505 B2
(45) Date of Patent: Jan. 10, 2023

(54) MINIMUM PRESSURE VALVE AND COMPRESSOR COMPRISING SUCH A MINIMUM PRESSURE VALVE

(71) Applicant: ATLAS COPCO AIRPOWER, NAAMLOZE VENNOOTSCHAP, Wilrijk (BE)

(72) Inventor: Pieter De Schamphelaere, Wilrijk (BE)

(73) Assignee: ATLAS COPCO AIRPOWER NAAMLOZE VENNOOTSCHAP, Wilrijk (BE)

(*) Notice: Subject to any disclaimer, the term of this patent is extended or adjusted under 35 U.S.C. 154(b) by 176 days.

(21) Appl. No.: 16/623,587

(22) PCT Filed: May 24, 2018

(86) PCT No.: PCT/IB2018/053673
§ 371 (c)(1),
(2) Date: Dec. 17, 2019

(87) PCT Pub. No.: WO2019/008451
PCT Pub. Date: Jan. 10, 2019

(65) Prior Publication Data
US 2020/0124041 A1 Apr. 23, 2020

Related U.S. Application Data

(60) Provisional application No. 62/529,769, filed on Jul. 7, 2017.

(30) Foreign Application Priority Data

Jan. 10, 2018 (BE) .................................. 2018/5011

(51) Int. Cl.
*F04B 49/03* (2006.01)
*F04B 39/08* (2006.01)
(Continued)

(52) U.S. Cl.
CPC .............. *F04B 49/03* (2013.01); *F04B 39/08* (2013.01); *F04B 39/10* (2013.01); *F04B 49/225* (2013.01);
(Continued)

(58) Field of Classification Search
CPC ........ F04B 49/03; F04B 49/225; F04B 53/10; F04B 39/08; F04B 39/10; F04B 2205/05;
(Continued)

(56) References Cited

U.S. PATENT DOCUMENTS 1,587,015 A 6/1926 Longacre
1,706,373 A 3/1929 Andersson
(Continued)

FOREIGN PATENT DOCUMENTS

CN 101520103 A 9/2009
CN 201391455 Y 1/2010
(Continued)

OTHER PUBLICATIONS

International Search Report for PCT/IB2018/053673 dated Aug. 7, 2018 [PCT/ISA/210].

*Primary Examiner* — Peter J Bertheaud
(74) *Attorney, Agent, or Firm* — Sughrue Mion, PLLC (57) ABSTRACT

The present invention is directed to a minimum pressure valve comprising a housing (13) with a valve inlet (11) and a valve outlet (12) which are connected by means of a chamber (16), said minimum pressure valve (10) further comprising a valve body (17) movable in said chamber (16) between a closed position in which said valve inlet (11) is closed off, and an open position in which said valve inlet (11) is open, whereby said minimum pressure valve (10) further comprises a regulation unit (18) for setting the value of the pressure at which the valve body (17) moves into an open position.

25 Claims, 5 Drawing Sheets

(51) Int. Cl.
  *F04B 49/22* (2006.01)
  *F04B 53/10* (2006.01)
  *F04B 39/10* (2006.01)
  *F04C 28/24* (2006.01)
  *F04C 28/06* (2006.01)
  *F04B 49/08* (2006.01)
  *F16K 1/12* (2006.01)
  *F16K 7/06* (2006.01)

(52) U.S. Cl.
  CPC .............. *F04B 53/10* (2013.01); *F04C 28/06* (2013.01); *F04C 28/24* (2013.01); *F04B 49/08* (2013.01); *F04B 2205/05* (2013.01); *F16K 1/126* (2013.01); *F16K 7/06* (2013.01)

(58) Field of Classification Search
  CPC .......... F04B 49/08; F04C 28/24; F04C 28/06; F16K 1/126; F16K 7/06
  See application file for complete search history.

(56) References Cited

U.S. PATENT DOCUMENTS

| | | | |
|---|---|---|---|
| 1,798,435 | A | 3/1931 | Saharoff |
| 4,388,046 | A * | 6/1983 | Boller ............ F04C 28/06 |
| | | | 417/295 |
| 5,540,558 | A | 7/1996 | Harden et al. |
| 2010/0219364 | A1 | 9/2010 | Martens |
| 2013/0000759 | A1 | 1/2013 | Killeen et al. |
| 2013/0139535 | A1 | 6/2013 | Nares et al. |
| 2016/0215777 | A1* | 7/2016 | De Schamphelaere ............ |
| | | | F04C 29/0014 |

FOREIGN PATENT DOCUMENTS

| | | |
|---|---|---|
| CN | 101836020 A | 9/2010 |
| GB | 1 597 718 A | 9/1981 |
| GB | 2 234 801 A | 2/1991 |

* cited by examiner

MINIMUM PRESSURE VALVE AND COMPRESSOR COMPRISING SUCH A MINIMUM PRESSURE VALVE

CROSS REFERENCE TO RELATED APPLICATIONS

This application is a National Stage of International Application No. PCT/IB2018/053673, filed on May 24, 2018, which claims priority from U.S. Patent Provisional Application No. 62/529,769, filed on Jul. 7, 2017, and Belgian Patent Application No. 2018/5011, filed on Jan. 10, 2018.

BACKGROUND OF THE INVENTION

Field of the Invention

This invention relates to a minimum pressure valve comprising a housing with a valve inlet and a valve outlet which are connected by means of a chamber, said minimum pressure valve further comprising a valve body movable in said chamber between a closed position in which said valve inlet is closed off, and an open position in which said valve inlet is open.

Background

It is known that compressor installations often comprise a minimum pressure valve (hereafter abbreviated MPV), often mounted at the outlet of a pressure vessel, which might serve for the purpose of separating liquid, such as oil in case of an oil injected compressor, from the compressed gas leaving the compressor element.

By injecting a liquid, such as for example oil, into the compressor element of the compressor during the compression of the gas, the temperature rise of the compressed gas can be kept under control. The cooling liquid is typically separated from the compressed gas stream in a liquid separator, which often is incorporated into a pressure vessel mounted downstream of the compressor element. The cooling liquid is then usually recycled and fed back, from the pressure vessel or liquid separator, through a cooler, to the compressor element.

While flowing through the cooling circuit, the pressure of the cooling liquid will drop. In order to make sure that the pressure of the cooling liquid is still sufficiently high in order to be re-injected into the compressor element, the pressure in the pressure vessel or liquid separator needs to be maintained at a sufficiently high level.

An MPV assures that the pressure in the pressure vessel, during load of the compressor installation, never drops below a determined minimum value. This minimum value is the setpoint of the MPV.

The setpoint is chosen such that the injection of cooling liquid is always guaranteed, under all conditions. This means that also during transient conditions the pressure will be maintained sufficiently high to avoid temperature peaks. The setpoint is also chosen in a way that the flow speed through the pressure vessel or liquid separator is not too high.

Such MPVs are used in the industry, like for example the one disclosed in CN 101,520,103 A.

A significant drawback of the known MPVs is that they tend to have a significantly high number of components interacting with each other. This translates into a significantly high amount of time needed for assembling such a minimum pressure valve on site, which translates into very high maintenance costs and losses associated with the compressor not being functional during this time frame.

Moreover, each of the components will have its own tolerance, these individual tolerances adding up and influencing the overall performance of the minimum pressure valve.

Furthermore, because of such a high number of components, during assembly some of them, for example the springs would require pre-tensioning, can easily damage the adjacent components entering in contact with such a spring.

SUMMARY OF THE INVENTION

Taking the above drawbacks into account it is an object of the present invention to provide a minimum pressure valve that would be easy to manufacture and mount, having a lot less interacting components and reducing the risk of an incorrect mounting or of an incorrect functioning of the minimum pressure valve after mounting.

The present invention aims at providing a minimum pressure valve that would be adaptable to be used within compressors of different capacities without the need of changing any components.

Consequently, the present patent application relates to a new design of minimum pressure valve, which is less prone to wear and potential failure than traditional minimum pressure valves.

To this aim the invention relates to a minimum pressure valve comprising a housing with a valve inlet and a valve outlet which are connected by means of a chamber, said minimum pressure valve further comprising a valve body movable in said chamber between a closed position in which said valve inlet is closed off, and an open position in which said valve inlet is open, whereby said minimum pressure valve further comprises a regulation unit for setting the value of the pressure at which the valve body moves into an open position.

Indeed, because the minimum pressure valve according to the present invention comprises a regulation unit, such minimum pressure valve can be adapted for any type of compressor without the need of changing specific components.

Another benefit is the minimum number of components that require expensive machining for such minimum pressure valve, reducing the costs associated with manufacturing and maintaining the functionality thereof, and also minimizing if not even eliminating the risk of such minimum pressure valve to have a lower risk to fail due to a faulty mounting or of damaged components during the mounting procedure. The failing possibly translating into a modified pressure value at which such a minimum pressure valve opens, which would be highly unwanted at the customer's end.

The present invention is further directed to a compressor comprising a compressor element having a gas inlet and a compressed gas outlet, the compressor further comprising a pressure vessel having an inlet connected to the compressed gas outlet, whereby a minimum pressure valve is provided at an outlet of said pressure vessel, said minimum pressure valve having a valve inlet connected to the outlet of the pressure vessel and a valve outlet adapted to be connected to a user's network, whereby said minimum pressure valve comprises a housing whereby the valve inlet and the valve outlet are connected by means of a chamber, a valve body movable in said chamber between a closed position in which said valve inlet is closed off, and an open position in which said valve inlet is open, whereby said minimum pressure valve further comprises a regulation unit for setting the value of the pressure at which the valve body moves into an open position.

The invention also relates to a method for regulating the pressure in a pressure vessel of a compressor, whereby the compressor further comprises a compressor element having a gas inlet and a compressed gas outlet, whereby the pressure vessel has an inlet connected to the compressed gas outlet, whereby a minimum pressure valve is provided at an outlet of said pressure vessel, said minimum pressure valve having a valve inlet connected to the outlet of the pressure vessel and a valve outlet adapted to be connected to a user's network, whereby said minimum pressure valve comprises a housing whereby the valve inlet and the valve outlet are connected by means of a chamber, a valve body movable in said chamber between a closed position in which said valve inlet is closed off, and an open position in which said valve inlet is open, whereby for setting the value of the pressure at which the valve body moves into an open position, use is made of a regulation unit.

Preferably, the regulating unit uses the pressure at the outlet of the pressure vessel for setting the value of the pressure at which the valve body moves into an open position.

However, it is also possible that the regulating unit uses the pressure at the inlet of the pressure vessel to set the value of the pressure at which the valve body moves into an open position. This will be better for the reliability.

Preferably, a minimum pressure valve according to the invention is used.

In the context of the present invention it should be understood that the benefits presented above with respect to the minimum pressure valve are also valid for the compressor and the method.

BRIEF DESCRIPTION OF THE DRAWINGS

With the intention of better showing the characteristics of the invention, some preferred configurations according to the present invention are described hereinafter by way of an example, without any limiting nature, with reference to the accompanying drawings, wherein.

DETAILED DESCRIPTION OF THE INVENTION

Figure 1:
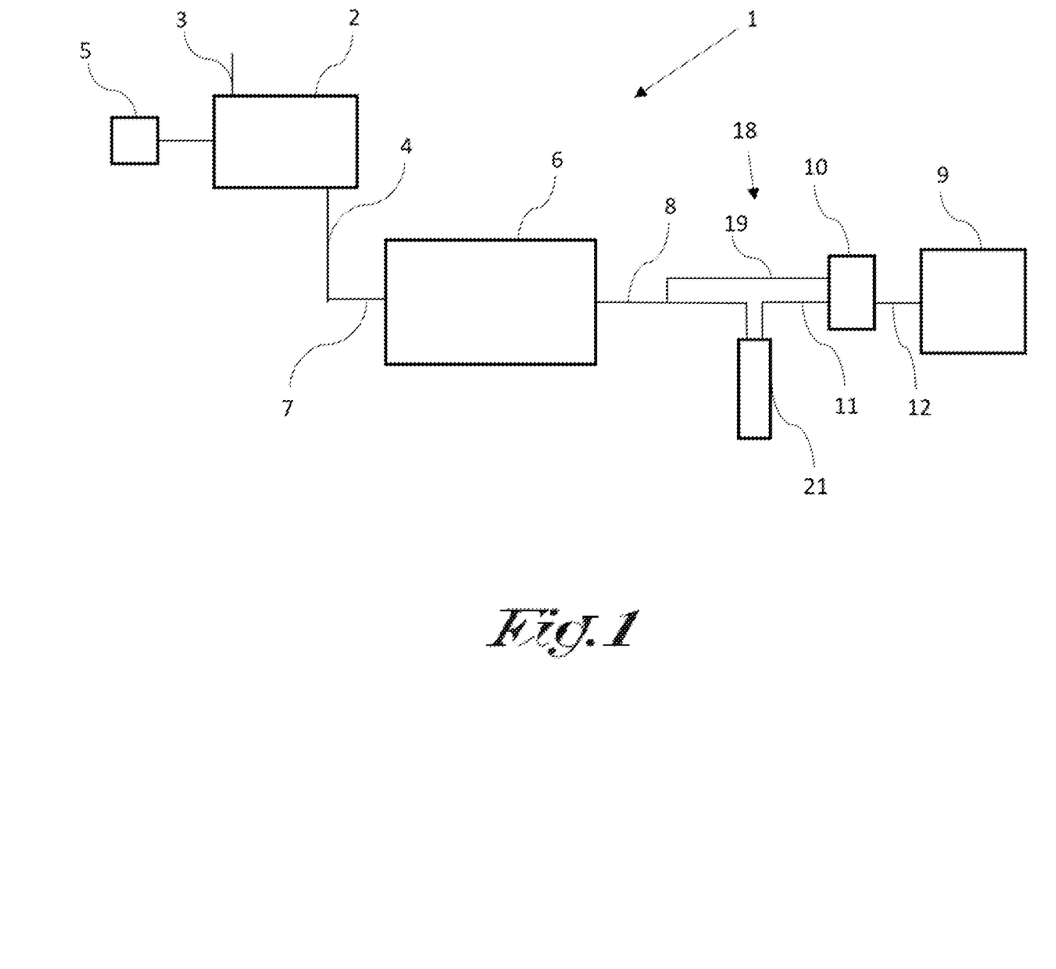
FIG. 1 schematically illustrates a compressor 1 according to the present invention.

FIG. 1 illustrates a compressor 1 comprising a compressor element 2 having a gas inlet 3 and a compressed gas outlet 4. Typically the compressor 1 is driven by a fixed speed or a variable speed motor 5.

In the context of the present invention, the compressor 1 should be understood as the complete compressor installation, including the compressor element 2, all the typical connection pipes and valves, the housing of the compressor 1 and possibly the motor 5 driving the compressor element 2.

In the context of the present invention, the compressor element 2 should be understood as the compressor element casing in which the compression process takes place by means of a rotor or through a reciprocating movement.

Further, said compressor element 2 can be selected from a group comprising: a screw, a tooth, a claw, a scroll, a rotary vane, a centrifugal, a piston, etc.

Returning now to FIG. 1, the compressor 1 further comprises a pressure vessel 6 having an inlet 7 connected to the compressed gas outlet 4, and an outlet 8 connected to a user's network 9.

Further, a minimum pressure valve 10 is provided at the outlet 8, on the fluid conduit provided between the pressure vessel 6 and the user's network 9.

Said minimum pressure valve 10 having a valve inlet 11 connected to the outlet 8 of the pressure vessel 6 and a valve outlet 12 adapted to be connected to a user's network 9.

Figure 2:
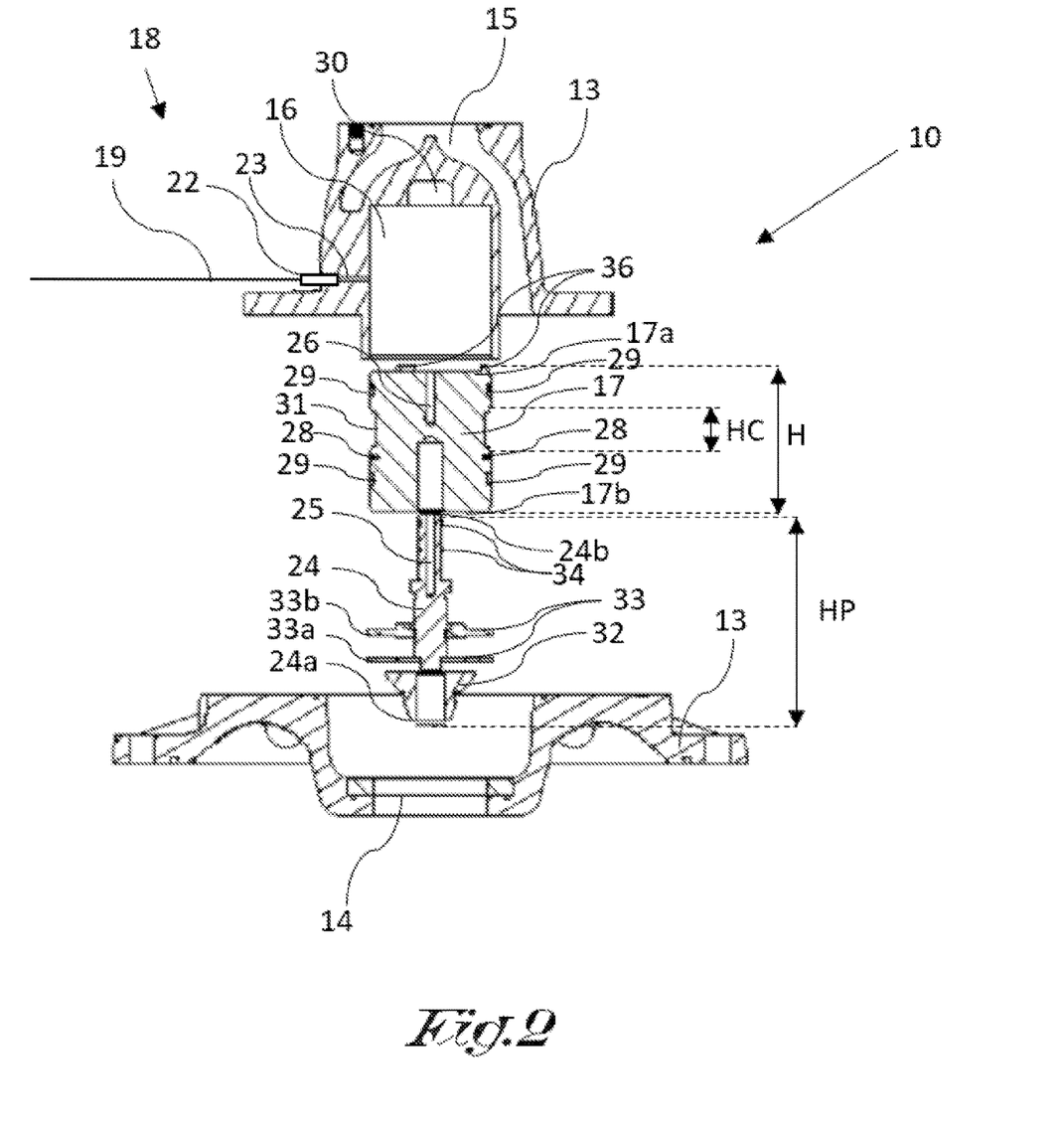
FIG. 2 schematically illustrates an exploded view of a cut-through of a minimum pressure valve 10 according to an embodiment of the present invention.

The minimum pressure valve 10 comprising a housing 13 with a housing inlet 14, a housing outlet 15 and a chamber 16, as illustrated in FIG. 2.

Said housing inlet 14 being brought in fluid communication with the valve inlet 11, and said housing outlet 15 being brought in fluid communication with the valve outlet 12 when said minimum pressure valve is mounted within the compressor 1.

The minimum pressure valve 10 further comprising a valve body 17 movable in said chamber 16 between a closed position in which said valve inlet 11 is closed off, and an open position in which said valve inlet 11 is open.

It goes without saying that when the valve inlet 11 is closed off, no fluid or practically no fluid is allowed to flow through the minimum pressure valve 10, therefore from the housing inlet 14 towards the housing outlet 15 and further towards the user's network 9. Whereas, when the valve inlet 11 is open, fluid is allowed to flow through the minimum pressure valve 10, from the housing inlet 14 towards the housing outlet 15 and further reaching the user's network 9.

For setting the value of the pressure at which the valve body 17 moves into an open position, the minimum pressure valve 10 according to the present invention further comprises a regulation unit 18. This regulating unit 18 is preferably a separate component of the minimum pressure valve 10.

In a preferred embodiment according to the present invention but not limiting thereto, the compressor 1 is a liquid injected compressor, case in which the pressure vessel 6 preferably comprises a liquid separation vessel (not shown), or such liquid separation vessel can be mounted as a separate component part of the compressor 1.

The liquid injected within said compressor 1 being any type of liquid such as for example and not limiting thereto: water, oil, with or without an additive provided therein.

In a preferred embodiment according to the present invention and not limiting thereto, the compressor 1 is oil injected.

It should be however not excluded that the minimum pressure valve 10 can be also mounted within an oil free compressor.

In another embodiment according to the present invention, the regulation unit 18 comprises a conduit 19 connecting a space 20 delimited between the valve body 17 and the chamber 16 with the outlet 8 of the pressure vessel 6.

The space 20 should be understood as the gap between the internal wall of the chamber 16 and the valve body 17, when the minimum pressure valve 10 is in a mounted state.

The space 20 will be used to be able to transport air to a first end 17a of the valve body 17.

It goes without saying that the chamber 16 defines a hollow space wherein the valve body 17 is received and comprises an internal wall and an external wall, said external wall being subjected to the pressure value of the fluid at the level of the housing outlet 15.

By connecting the space 20 with the outlet 8, the pressure value at the level of said space 20 is influenced by the pressure value at the level of the outlet 8. Accordingly, the force generated by such pressure value and acting onto the valve body 17 is influencing the opening and the closing of the minimum pressure valve 10.

Preferably, the regulation unit 18 and the geometry of the conduit 19 influence the rapidity with which such pressure is increased or decreased and also the pressure value at which the minimum pressure valve 10 opens or closes.

Returning to FIG. 1, the compressor 1 can further comprises an oil separation element 21 provided on the outlet 8, between the pressure vessel 8 and the minimum pressure valve 10.

In other words, the oil separation element 21 is provided downstream of the pressure vessel 6.

Such oil separation element 21 being of any type, as for example, and not limiting thereto: any type of filter, any type of oil separation vessel, or other.

In a preferred embodiment according to the present invention and not limiting thereto, the conduit 19 connects the space 20 with the outlet 8 of the pressure vessel 8, upstream from the oil separation element 21.

It could be equally possible for such a conduit 19 to connect the space 20 with the outlet 8 of the pressure vessel 6, downstream of the oil separation element 21, case in which the pressure value at the outlet 8 will be affected by the pressure drop across the oil separation element 21.

In a preferred embodiment according to the present invention, the minimum pressure valve 10, when mounted in a vertical position, does not comprise a spring.

The minimum pressure valve 10 according to the present embodiment replaces in fact a spring which is typically used within known minimum pressure valves, with a regulation unit 18, eliminating components which would be difficult to mount or change on site.

In typically used minimum pressure valves 10, a spring is used for setting the pressure value at which the minimum pressure valve is opened, and depending on the capacity and operating pressure range of the compressor 1, such a spring is chosen.

By replacing such spring with a regulation unit 18, such pressure value can be adapted according to the capacity of the compressor 1. Consequently, the manufacturing and servicing costs drop and the lifetime of the minimum pressure valve 10 is also increased.

Such regulation unit 18 allowing for a manual change of the pressure value or for an automatized change.

Returning to the layout of the minimum pressure valve 10, the valve body 17 comprises a first end 17a positioned closest to the housing outlet 15 and a second end 17b positioned closest to the housing inlet 14, when the minimum pressure valve 10 is in a mounted state.

Preferably, but not limiting thereto, the conduit 19 helps in delimiting two areas within the minimum pressure valve 10, such areas having two different or relatively two different pressure values. More specifically, the difference between the area of the first end 17a of the valve body 17, and the area at the inlet 14 of the valve.

Said conduit 19 can be connected at any location along the height H of the valve body 17 or at any location within said chamber 16.

In this case, the conduit 19 is connected to the chamber at approximately half of the height H, or at a relatively small distance from the half of said height H. However, this is not necessary for the invention.

Depending on the size of said minimum pressure valve 10, the conduit 19 can be mounted at a distance from the half of said height H ranging from a couple of centimeters to possibly tens of centimeters.

In another embodiment according to the present invention, the regulation unit 18 comprises a restricting module 22 adapted to be connected on the one hand to the conduit 19 and on the other hand onto a channel 23 created through the housing and a wall of the chamber.

The channel 23 allowing fluid communication between the fluid flowing through the conduit 19 and the space 20 created between the internal wall of the chamber 16 and the valve body 17. Consequently the channel 23 is created as a cut through the housing 13 and the wall of the chamber 16.

In a preferred embodiment but not limiting thereto, the restricting module 22 comprises an adjustable element capable of regulating the volume of fluid flowing through said channel 23.

Said adjustable element being selected from a group comprising: a screw, a ball valve, a butterfly valve, a plate valve, disk valve, a poppet valve, a ring valve, or any other element capable of selectively restricting the flow of fluid through the channel 23.

However, this is not necessary for the invention and can be omitted.

The adjustable element having a flow regulation pattern defined by a linear or a non-linear graph, or an ON/OFF type of regulation.

The actuation of such adjustable element being either manual or automatized.

If the actuation is automatized, said adjustable element can be connected through a wired or wireless connection to a control unit (not shown) allowing for an electronic adjustment of the opening degree or of the position of said adjustable element.

Another possibility is for the adjustable element to be set at one time, or for the minimum pressure valve 10 to have a continuous regulation of said adjustable element.

Figure 4:
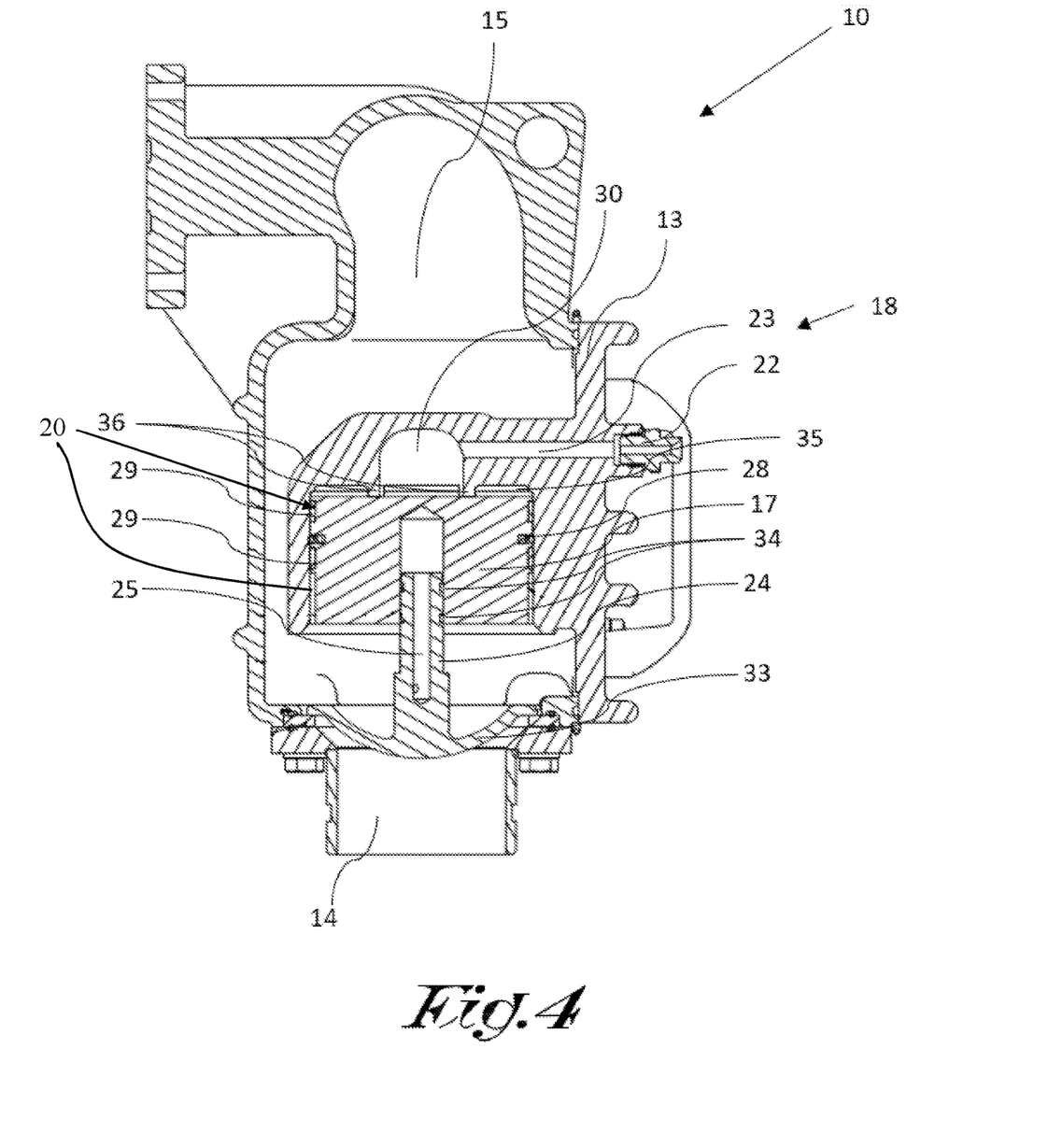
FIG. 4 schematically illustrates a cut-through of a minimum pressure valve 10 according to another embodiment of the present invention.

In a preferred embodiment according to the present invention and not limiting thereto, the restricting module comprises a screw for adapting the flow of fluid flowing through said channel 23 (as shown in FIG. 4).

In such a situation a thread is preferably provided within the channel 23, allowing the screw to be screwed more or less, depending on the volume of fluid desired to be allowed to flow through said channel 23.

If the screw is mounted relatively loose, a bigger volume of fluid is allowed to flow though said channel 23 and reach the space 20, allowing the pressure value of the fluid within said space 20 to faster reach the value of the pressure of the fluid at the level of the outlet 8.

Whereas if the screw is screwed more within the thread, a smaller volume of fluid is allowed to flow through the channel 23 and to reach the space 20, allowing for the pressure value of the fluid within said space 20 to slower reach the value of the pressure of the fluid at the level of the outlet 8.

In a further embodiment according to the present invention, the valve body 17 comprises a piston 24 received therein movable between a closed position in which the housing inlet 14 is closed off and an open position in which said housing inlet 14 is open.

In an embodiment according to the present invention but not limiting thereto, for achieving a stable and balanced minimum pressure valve 10, said piston 24 can be retrieved through the middle of the valve body 17, or approximately through the middle.

Accordingly, the force generated by the pressure value at the level of the chamber 16 by the fluid flowing through the conduit 19 and further through the channel 23 is acting on both the valve body 17 and onto the piston 24.

Such piston 24 comprising a first piston end 24a positioned closest to the housing inlet 14 and a second piston end 24b, positioned within the valve body 17, closest to the first end 17a, when said piston 24 is mounted within the valve body 17.

In another embodiment according to the present invention, but not limiting thereto, the piston 24 can comprise a piston channel 25, such a channel 25 allowing for a equalization of the pressure such that the piston 24 can glide inside the valve body 17 without any resistance. Accordingly, the height of the piston channel 25 can be chosen during design and it can vary between a fraction of the total height HP of the piston 24 and the total height of the piston 24 HP.

Preferably, if the piston channel 25 is created through the entire height HP of the piston 24, piston 24 further comprises a nozzle (24c) at the level of the first piston end 24a for controlling the amount of fluid circulating therethrough.

In yet another embodiment according to the present invention the valve body 17 can comprise a duct 26, preferably positioned through the middle or relatively through the middle of the vale body 17, starting from the first end 17a and projecting through the valve body 17 towards the second end 17b. Such a duct 26 being created in the direction of the flow of fluid flowing through the minimum pressure valve 10 when said minimum pressure valve 10 is in open position. It should be noted that the flow that passes through the minimum pressure valve 10 does not pass through the duct 26 of the valve body 17. There will only be a flow through the duct 26 when the valve body 17 moves.

The height of the duct 26 can be selected according to the requirements of the minimum pressure valve 10 and the response time needed.

Such duct 26 allowing for the force generated within the chamber 16 to act on a bigger surface of the valve body 17.

In another embodiment according to the present invention and not limiting thereto, the duct 26 comprises a transversal ramification 27, created preferably perpendicular or relatively perpendicular onto the duct 26 and reaching the chamber 16. Consequently the space delimited between the space 20 at the level of the channel 23 or relatively close to where the channel 23 reaches the space 20 is brought in fluid communication with the space delimited between the internal wall of the chamber 16 and the body of the valve 17 at the level of the first end 17a. This will allow for the controlled pressure to reach the surface of the first end 17a.

In a further preferred embodiment according to the present invention, when mounted, said minimum pressure valve 10 does not comprise a spring between the valve body 17 and the piston 24.

Consequently, the correctness of mounting the minimum pressure valve 10 according to the present embodiment is assured, and the amount of time needed to assemble or disassemble such a minimum pressure valve 10 is reduced considerably.

Moreover, the manufacturing and servicing costs are even more reduced since such a typically used spring is replaced by a channel 23, a duct 26, and a specific manner in which the force generated by the pressure at the level of the chamber 16 is allowed to act onto the valve body 17 and onto the piston 24. In fact the omission of the spring means a reduction in the volume of material used to manufacture the components of such minimum pressure valve 10.

The aforementioned specific manner in which the force generated by the pressure at the level of the chamber 16 is allowed to act onto the valve body 17 and piston 24 is being set up through the geometry characteristics of the channel 23, duct 26 and the total surface of the valve body 17 onto which the force generated by the pressure of the fluid flowing through said channel 23 is acting.

In another embodiment according to the present invention, the valve body 17 comprises a seal 28 adapted to be mounted on the outer contour of the valve body 17, between the valve body 17 and the internal wall of the chamber 16.

The seal 28 is mounted under the level where the channel 23 is created, therefore between the height at which the channel 23 is created and the second end 17b, when the minimum pressure valve 10 is in a mounted state, such minimum pressure valve 10 being in a closed position.

Consequently, such a seal 28 is positioned such that a separation is created between the space 20 whereby the pressure value is influenced by the pressure of the fluid flowing through said channel 23 and the space delimited between the seal 28 and the second end 17b.

Depending on the requirements of the minimum pressure valve 10, more than one seal 28 can be mounted, such as for example 2, 3 or more seals.

Figure 5:
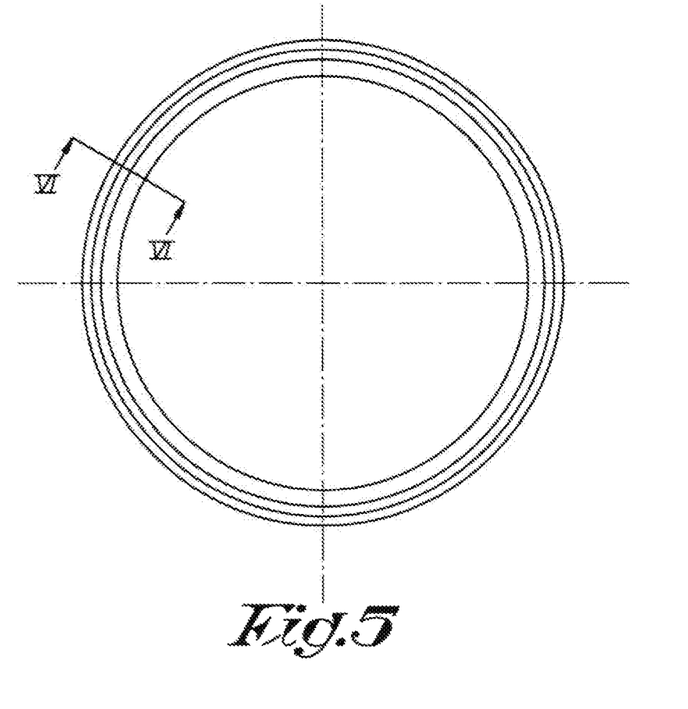
FIGS. 5 and 6 schematically illustrate a seal 28 which can be used with the minimum pressure valve 10 according to the invention.
Figure 6:
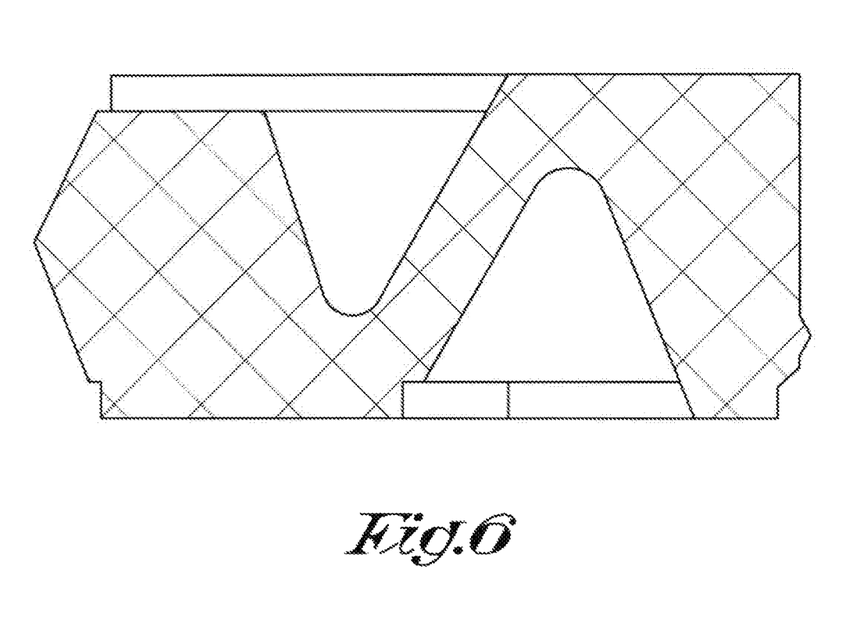

Preferably a bidirectional seal is used. This is a seal that will work in both directions. FIGS. 5 and 6 show a cross-section of such a seal.

Alternatively, two singeacting seals can be used, which are placed back-to-back or front-to-front in series.

Although in figures, the seal is placed around the valve body 17; it would also be possible to place it inside the housing 13 of the minimum pressure valve 10, by providing a groove in the chamber 16.

Preferably, but not limiting thereto, such seals can be characterized by very low friction and very little stick slip.

In a further embodiment according to the present invention, the valve body 17 comprises a guiding unit 29 adapted to be mounted on the outer contour of the valve body 17, between the valve body 17 and the internal wall of the chamber 16.

Such guiding unit 29 reducing the wear of the valve body 17 and of the internal wall of the chamber 16, wear that would be cause by the movement of the valve body 17 within the chamber 16 and the friction generated thereon.

Moreover, such guiding units absorbing the transverse forces occurring during the movement of the valve body 17 within the chamber 16.

In a preferred embodiment according to the present invention but not limiting thereto, the seal 28 is received in between two guiding units 29.

Consequently, the wear is avoided on the height H of the valve body 17 and the stability of the valve body 17 while moving within the chamber 16 is maintained.

In another embodiment according to the present invention, the guiding unit 29 can be in the shape of a seal, a guiding ring or a guiding tape.

Preferably, for ease of mounting, but not limiting thereto, the guiding unit 29 is in the shape of guiding tape.

Such guiding tape can have a composition selected from a group comprising: a polymer based composition, PFTE (Polytetrafluoroethylene) based composition, metal based composition, elastomer based composition, fiber and resin based composition, thermoplastic and fiber glass based composition, any combination thereof or any other composition. However, the guiding tape can be of any other suitable material.

In a further embodiment according to the present invention, the chamber 16 comprises a groove 30 or recess above a first end 17a of said valve body 17.

Such a groove 30 being created in any shape such as for example and not limiting thereto: rectangle, arch of a circle, pyramidal, in the shape of a dome, in the shape of a mushroom or any other shape.

Preferably, but not limiting thereto, the groove 30 can be created in the shape of a rectangle with rounded edges, whereby the walls of the rectangle are created by the internal wall of the chamber 16, having an open end towards the valve body 17.

Such groove 30 creating a hollow space between the internal wall of the chamber 16 and the valve body 17 at the level of the first end 17a.

In yet a further embodiment according to the present invention, the valve body 17 further comprises a carved section 31 at the level of the channel 23.

Such carved section 31 creating an internal space between the internal wall of the chamber 16 and the valve body 17 allowing for the pressure of the fluid flowing through the channel 23 to have a bigger influence onto the valve body 17.

Preferably, but not limiting thereto, the carved section can be realized along the circumference of the valve body 17, creating a circular channel. Consequently, no matter where the transversal ramification 27 is positioned along the circumference, the fluid flowing through the channel 23 is reaching the groove 30.

In a further embodiment according to the present invention but not limiting thereto, the carved section 31 has a height HC equal to the stroke of the valve.

Consequently, irrespective of the position of the valve, the fluid flowing through the channel 23 is reaching the space 20.

In yet another embodiment according to the present invention, the guiding unit 29 comprises a first guiding tape mounted on the outer contour of the valve body 17, between the carved section 31 and a first end 17a of said valve body 17.

In a further embodiment, the guiding unit 29 further comprises a second guiding tape mounted on the outer contour of the valve body 17, between the carved section 31 and a second end 17b of said valve body 17.

The carved section 31 is used to transport the controlled pressure to the first end 17a of the valve body 17.

In yet another embodiment according to the present invention, the piston 24 comprises a conical section 32 and a step section 33, said step section 33 being adapted to be brought in contact with the housing 13 of the minimum pressure valve 10 and whereby the conical section 32 is provided between the step section 33 and the housing inlet 14.

The piston 24 with the conical section 32 and the step section 33 are made such that a guidance for the flow is created, ensuring little or no resistance and to have such a weight such that it will fall down under the gravity when no other external forces are applied. The piston 24 will also take care of the sealing between the outlet 12 of the minimum pressure valve 10 and the outlet of the pressure vessel 6.

In a further embodiment according to the present invention, the step section 33 comprises a seal 33a between a main step section 33b and the housing 13, for reducing the wear of the step section 33 and increasing the sealing capabilities when the minimum pressure valve 10 is brought into a closed state.

The seal 33a and the main step section 33b are preferably fixed through mounting onto the conical section 32.

In yet another embodiment according to the present invention, as illustrated in FIG. 4, the channel 23 is fluidly connecting the space, delimited by the groove 30 or recess, with the valve inlet 11.

It should be however not excluded that, as explained above, the channel 23 can fluidly connect the space delimited by the groove 30 with the outlet 8 of the pressure vessel 6.

In a further embodiment according to the present invention, the piston 24 comprises a semi-circular step section, said semi-circular step section being adapted to be brought in contact with the housing 13, as illustrated in FIG. 4.

If such a layout of the step section 33 is adopted, the piston 24 would not require a conical section 32 anymore, reducing even more the layout of the minimum pressure valve and reducing the number of components.

Preferably but not limiting thereto, the semi-circular step section further comprises a flange at the level of the outer contour, said flange entering in contact with the housing 13 when the minimum pressure valve 10 is brought into a closed position.

For achieving a smooth movement between the piston 24 and the valve body 17, and for protecting the piston 24 and the valve body 17 from the damaging effects of the friction generated thereon, the piston 24 further comprises a second guiding unit 34 adapted to be mounted between the piston 24 and the valve body 17.

In a further embodiment according to the present invention, a top space 35 is created between the chamber 16 and the first end 17a of the valve body 17.

Figure 3:
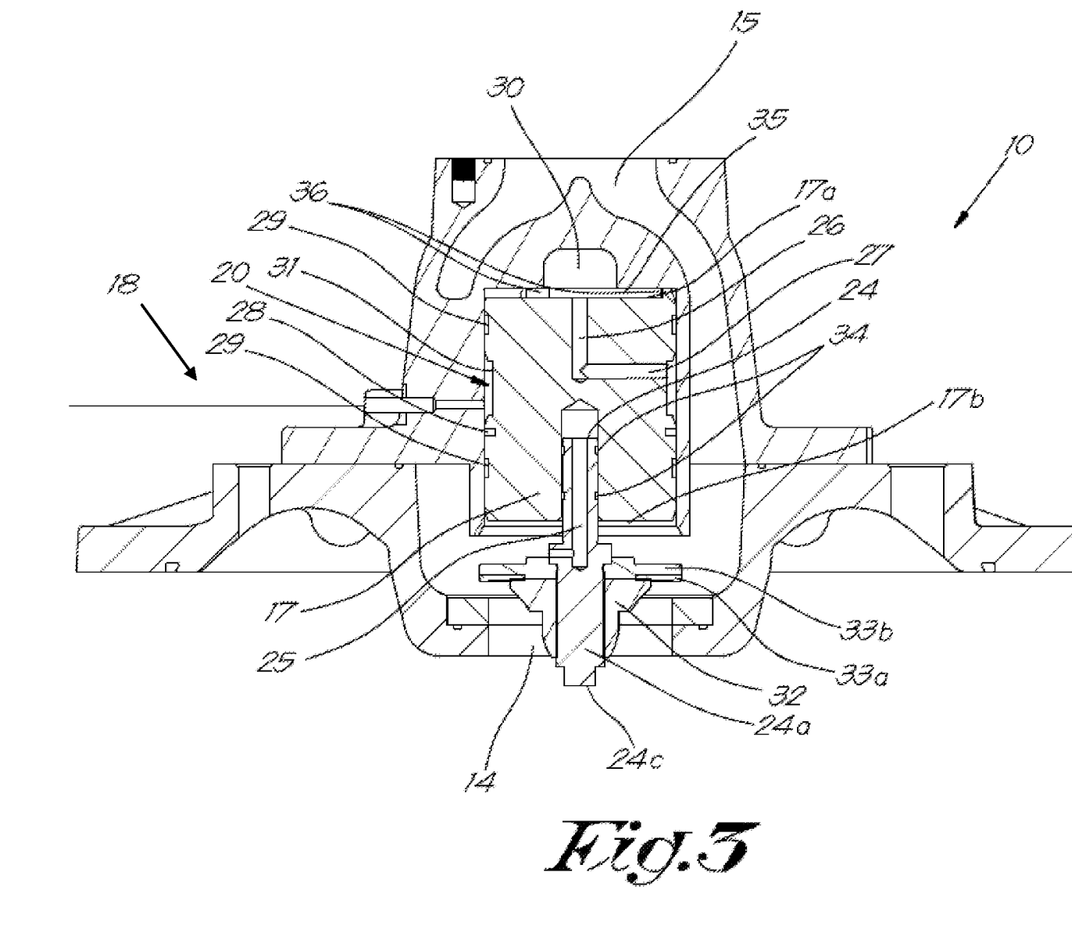
FIG. 3 schematically illustrates a cut-through of a minimum pressure valve 10 according to an embodiment of the present invention.

In order to create such a top space 35, either the valve body 17 can comprise leg structures 36 positioned onto the first end 17a, as shown in FIGS. 2 and 3, or the chamber 16 can comprise such leg structures 36, as shown in FIG. 4.

The shape of such leg structures 36 being chosen such that they can withstand the force of impact between the valve body 17 and the chamber 16, and in such a way that the valve body 17 would not get stuck while moving into a closed position.

Said top space 35 being created such that the surface onto which the force generated by the pressure of the fluid flowing through the channel 23 is acting onto the valve body is maximized, while the minimum pressure valve 10 is in a closed state.

It should be understood that the shape of the valve body 17, the chamber 16 and of the piston 24 can be any shape.

Preferably and not restricting thereto, the shape is circular.

In a further embodiment according to the present invention, the housing 13, the valve body 17 and the piston 24 can be manufactured through any known technique such as casting or additive manufacturing. Other techniques are of course possible.

For reducing even more the manufacturing costs and material needed therefore, the housing 13, the valve body 17 and the piston 24 can be manufactured through additive manufacturing.

Depending on the design of the minimum pressure valve 10, said minimum pressure valve 10 can comprise some or even all the technical features presented herein, in any combination without departing from the scope of the invention. By technical features it is meant at least: all the components of the compressor 1, the conduit 19, the space 20, the restricting module 22, the channel 23, the piston 24, the piston channel 25, the duct 26, the transversal ramification 27, the seal 28, the guiding unit 29, the groove 30, the carved section 31, the conical section 32, the step section 33, the seal 33*a*, the main step section 33*b*, the second guiding unit 34, the top space 35 and the leg structures 36. Not all these features need to be present. For example, the space 20 is only needed in one embodiment. The seal 33*a* is not present in the embodiment of FIG. 4, where metal-to-metal contact is used for the sealing. Furthermore, the duct 26 and the transversal ramification 27 are not necessary.

The operation of the minimum pressure valve 10 is very simple and as follows.

The piston 24, the conical section 32, the step section 33, the seal 33*a* and the main step section 33*b* are all connected to one another to form one piece or a so called check valve assembly.

This check valve assembly can move or slide inside a cavity in the valve body 17.

The check valve assembly can move freely down when the valve body 17 is in the open position. This is the position shown in FIG. 3, whereby the valve body 17 is upwards.

When the valve body 17 moves down, the check valve assembly will be moved down with it.

In this closed position of the minimum pressure valve 10, the valve body 17 closes off the valve inlet 11 by pressing the piston 24 of the check valve assembly against the valve housing 13 at the valve inlet 11.

In this closed position, there will be no or practically no fluid allowed to flow through the minimum pressure valve 10.

The valve body 17 will remain in this closed position as long as the pressure at the second end 17*b* of the valve body 17, which corresponds to the pressure at the valve inlet 11 when the valve body 17 is in the closed position, remains below or up to a certain pressure value. This pressure value corresponds to the setpoint of the minimum pressure valve 10.

Once the pressure at the second end 17*b* of the valve body 17 is equal to or larger than this certain pressure value, the valve body 17 will move to the open position, whereby the valve body 17 does not close off the valve inlet 11 and the piston 24 will move to the open position, as long as the pressure at the valve inlet 11 is larger than the pressure at the valve outlet 12.

In this open position of the minimum pressure valve 10, there will be fluid allowed to flow through the minimum pressure valve 10.

The aforementioned pressure value, corresponding to the setpoint of the minimum pressure valve 10, depends on the pressure to which the first end 17*a* of the valve body 17 is subjected or on the pressure in the space 20.

This pressure can be regulated by the regulating unit 18. To this end, the regulating unit 18 comprises the conduit 19, the restricting module 22 with an adjustable element and the channel 23.

The conduit 19 will allow to use the pressure at the outlet of the pressure vessel 8 to vary the pressure in the space 20 by allowing a flow via the conduit 19, the restricting module 22 and the channel 23.

In the examples, the flow will flow further via the carved section 31, the transversal ramification 27 and the duct 26 towards the groove 30. In this way, the pressure at the first end 17*a* of the valve body 17 can be influenced by this flow.

The regulating unit 18 can determine if and how the pressure at the first end 17*a* of the valve body 17 can be influenced. For example, the adjustable element or the aforementioned screw in the channel 23 as shown in FIG. 4, can be controlled by the regulating unit 18. The regulating unit 18 will control the pressure at which the valve body 17 will move, whereas the channel 23 will determine how fast the valve body 17 will move.

In this way, the regulation unit 18 can determine the setpoint at which the minimum pressure valve 10 will open, i.e. at which point the valve body 17 will move to the open position.

Only when the pressure at the valve inlet 11 is different than the pressure to which the first end 17*a* of the valve body 17 is subjected, the valve body 17 will move towards the open position. This is dependent of course on the chosen ratio of the diameters of the first end 17*a* and the valve inlet 11.

Therefore, by increasing the pressure at the first end 17*a* of the valve body 17, the pressure at the valve inlet 11 needs to be larger before the valve 10 will open, such that it can be assured that the pressure in the pressure vessel 6 never drops below a determined minimum value.

The present invention is by no means limited to the embodiments described as an example and shown in the drawings, but such a minimum pressure valve 10 can be realized in all kinds of variants, without departing from the scope of the invention.

The invention claimed is:

1. A minimum pressure valve comprising:
    a housing (13) with a housing inlet (14) and a housing outlet (15) which are connected by a chamber (16) of the housing (13);
    a valve body (17) movable in said chamber (16) between a closed position in which said housing inlet (14) is closed off, and an open position in which said housing inlet (14) is open;
    a regulation unit (18) for setting the value of the pressure at which the valve body (17) moves into the open position; and
    a piston (24) within a hole of the valve body (17) that extends into the valve body (17) in a first direction, the piston (24) configured to move between the closed position in which the housing inlet (14) is closed off and the open position in which said housing inlet (14) is open,
    wherein said minimum pressure valve (10) does not comprise a spring between the valve body (17) and the piston (24).

2. The minimum pressure valve according to claim 1, wherein the minimum pressure valve (10) does not comprise a spring.

3. The minimum pressure valve according to claim 1, wherein the regulation unit (18) comprises a conduit (19) fluidly connecting a space (20) delimited between the valve body (17) and the chamber (16) with the housing inlet (14).

4. The minimum pressure valve according to claim 1, wherein the valve body (17) comprises a seal (28) that is mounted on an outer contour of the valve body (17), between the valve body (17) and an internal wall of the chamber (16).

5. The minimum pressure valve according to claim 1, wherein the valve body (17) comprises a guiding unit (29)

mounted on an outer contour of the valve body (17), between the valve body (17) and the chamber (16).

6. The minimum pressure valve according to claim 4, wherein the seal (28) is received in between two guiding units (29).

7. The minimum pressure valve according to claim 1, wherein the chamber (16) comprises a groove (30) above a first end (17a) of said valve body (17) in the first direction, the first end (17a) being closest to the housing outlet (15).

8. The minimum pressure valve according to claim 1, wherein the piston (24) comprises a semi-circular step section, said semi-circular step section being adapted to be brought in contact with the housing (13).

9. The minimum pressure valve according to claim 1, wherein the piston (24) comprises a guiding unit (34) that is mounted between the piston (24) and the valve body (17).

10. The minimum pressure valve according to claim 7, wherein a top space (35) is between the chamber (16) and the first end (17a) of the valve body (17) in the first direction.

11. A minimum pressure valve comprising:
a housing (13) with a housing inlet (14) and a housing outlet (15) which are connected by a chamber (16) of the housing (13);
a valve body (17) movable in said chamber (16) between a closed position in which said housing inlet (14) is closed off, and an open position in which said housing inlet (14) is open;
a regulation unit (18) for setting the value of the pressure at which the valve body (17) moves into the open position; and
a piston (24) within a hole of the valve body (17) that extends into the valve body (17) in a first direction, the piston (24) configured to move between the closed position in which the housing inlet (14) is closed off and the open position in which said housing inlet (14) is open,
wherein the regulation unit (18) comprises a conduit (19) fluidly connecting a space (20) delimited between the valve body (17) and the chamber (16) with the housing inlet (14), and
wherein the regulation unit (18) comprises a restricting module (22) connected to the conduit (19) and to a channel (23) through the housing (13) and a wall of the chamber (16).

12. The minimum pressure valve according to claim 11, wherein the restricting module (22) comprises a screw for adapting the flow of fluid flowing through said channel (23).

13. The minimum pressure valve according to claim 11, wherein at the level of the channel (23) the valve body (17) comprises a carved section (31).

14. The minimum pressure valve according to claim 13, wherein the carved section (31) has a height equal to a stroke of the valve body (17).

15. The minimum pressure valve according to claim 13, wherein the valve body (17) comprises a guiding unit (29) mounted on an outer contour of the valve body (17), between the valve body (17) and the chamber (16), and
the guiding unit (29) comprises a guiding tape mounted on an outer contour of the valve body (17), between the carved section (31) and a first end (17a) of said valve body (17), the first end (17a) being closest to the housing outlet (15).

16. The minimum pressure valve according to claim 13, wherein
the valve body (17) comprises a guiding unit (29) mounted on an outer contour of the valve body (17), between the valve body (17) and the chamber (16), and
the guiding unit (29) further comprises a guiding tape mounted on an outer contour of the valve body (17), between the carved section (31) and a second end (17b) of said valve body (17) in a second direction opposite to the first direction, said second end (17b) being closest to the housing inlet (14).

17. The minimum pressure valve according to claim 11, wherein
the chamber (16) comprises a groove (30) above a first end (17a) of said valve body (17) in the first direction, the first end (17a) being closest to the housing outlet (15), and
the channel (23) is fluidly connecting the space delimited by the groove (30) with the housing inlet (14).

18. A compressor comprising:
a compressor element (2) having a gas inlet (3) and a compressed gas outlet (4);
a pressure vessel (6) having an inlet (7) connected to the compressed gas outlet (4);
a minimum pressure valve (10) provided at an outlet (8) of said pressure vessel (6), said minimum pressure valve (10) comprising:
a housing inlet (14) connected to the outlet (8) of the pressure vessel (6);
a housing outlet (15) adapted to be connected to a user's network (9),
a housing (13) whereby the housing inlet (14) and the housing outlet (15) are connected by a chamber (16) of the housing (13);
a valve body (17) movable in said chamber (16) between a closed position in which said housing inlet (14) is closed off, and an open position in which said housing inlet (14) is open;
a regulation unit (18) for setting the value of the pressure at which the valve body (17) moves into an open position; and
a piston (24) within a hole of the valve body (17) that extends into the valve body (17) in a first direction, the piston (24) configured to move between the closed position in which the housing inlet (14) is closed off and the open position in which said housing inlet (14) is open,
wherein said minimum pressure valve (10) does not comprise a spring between the valve body (17) and the piston (24).

19. The compressor according to claim 18, wherein the compressor (1) is a liquid injected compressor.

20. The compressor according to claim 18, wherein the compressor (1) is oil injected.

21. The compressor according to claim 18, wherein the regulation unit (18) comprises a conduit (19) connecting a space (20) delimited between the valve body (17) and the chamber (16) with the outlet (8) of the pressure vessel (6).

22. The compressor according to claim 18, wherein the compressor (1) further comprises an oil separation element (21) provided on the outlet (8) of the pressure vessel (6), between the pressure vessel (6) and the minimum pressure valve (10).

23. The compressor according to claim 22, wherein the conduit (19) connects a space (20) delimited between the valve body (17) and the chamber (16) with the outlet (8) of the pressure vessel (6), before the oil separation element (21).

24. A method for regulating the pressure in a pressure vessel (6) of a compressor (1), whereby the compressor (1) further comprises a compressor element (2) having a gas inlet (3) and a compressed gas outlet (4), whereby the pressure vessel (6) has an inlet (7) connected to the compressed gas outlet (4), whereby a minimum pressure valve (10) according to claim 1 is provided at an outlet (8) of said pressure vessel (6), said minimum pressure valve (10) having a housing inlet (14) connected to the outlet (8) of the pressure vessel (6) and a housing outlet (15) adapted to be connected to a user's network (9), whereby said minimum pressure valve (10) comprises a housing (13) whereby the housing inlet (14) and the housing outlet (15) are connected by a chamber (16) of the housing (13), a valve body (17) movable in said chamber (16) between a closed position in which said housing inlet (14) is closed off and an open position in which said housing inlet (14) is open, a regulation unit (18) for setting the value of the pressure at which the valve body (17) moves into the open position, and a piston (24) within a hole of the valve body (17) that extends into the valve body (17) in a first direction, the piston (24) configured to move between the closed position in which the housing inlet (14) is closed off and the open position in which said housing inlet (14) is open, wherein the method comprises:

setting, using the regulation unit (18), a value of pressure at which the valve body (17) moves into the open position, wherein said minimum pressure valve (10) does not comprise a spring between the valve body (17) and the piston (24).

25. The method according to claim 24, wherein the regulation unit (18) uses a pressure at the outlet (8) of the pressure vessel (6) for setting the value of the pressure at which the valve body (17) moves into the open position.

* * * * *